(12) United States Patent
Keren

(10) Patent No.: US 8,630,618 B2
(45) Date of Patent: Jan. 14, 2014

(54) REAL TIME CHARGING OF SHORT MESSAGES ORIGINATED BY ROAMING PREPAID SUBSCRIBERS

(75) Inventor: Eitan Keren, Rosh Ha'ayin (IL)

(73) Assignee: Partner Communications Company Ltd., Rosh Ha'ayin (IL)

( * ) Notice: Subject to any disclaimer, the term of this patent is extended or adjusted under 35 U.S.C. 154(b) by 0 days.

(21) Appl. No.: 13/431,052

(22) Filed: Mar. 27, 2012

(65) Prior Publication Data

US 2013/0231083 A1 Sep. 5, 2013

Related U.S. Application Data

(63) Continuation of application No. PCT/IL2012/000102, filed on Mar. 4, 2012.

(51) Int. Cl.
*H04M 11/00* (2006.01)
(52) U.S. Cl.
USPC ........ 455/408; 455/406; 455/407; 455/432.1; 455/432.2; 455/466; 379/114.1
(58) Field of Classification Search
USPC ...................... 455/408, 406, 407, 432.3, 466; 379/114.2
See application file for complete search history.

(56) References Cited

U.S. PATENT DOCUMENTS

| | | | |
|---|---|---|---|
| 7,181,194 B2 * | 2/2007 | McCann et al. | 455/408 |
| 2003/0091170 A1 * | 5/2003 | McCann et al. | 379/114.2 |
| 2003/0143996 A1 * | 7/2003 | Peglion | 455/432 |
| 2006/0205404 A1 * | 9/2006 | Gonen et al. | 455/432.1 |
| 2007/0021101 A1 * | 1/2007 | McCann et al. | 455/405 |
| 2008/0045246 A1 * | 2/2008 | Murtagh et al. | 455/466 |
| 2011/0098066 A1 * | 4/2011 | Goermer et al. | 455/466 |
| 2011/0124331 A1 * | 5/2011 | Jiang | 455/432.1 |

* cited by examiner

*Primary Examiner* — Charles Shedrick
(74) *Attorney, Agent, or Firm* — Merchant & Gould P.C.

(57) ABSTRACT

A Home Location Register (HLR) and an Interworking Gateway (IWG) of an operator are configured to redirect Mobile Originated Short Messages (MO SM) sent by roaming cellular communication devices of both prepaid and postpaid subscribers hosted by a foreign network to a real time charging gateway (RTCG). The RTCG retrieves from the operator's database the type of subscription of the sending device. If the device is of a postpaid subscription, the RTCG operates as a relay between an SMSC and the foreign network. If the device is of a prepaid subscription, the RTCG communicates with a PrePaid System (PPS) and forwards the MO SM to the SMSC only in case there are sufficient funds in the respective prepaid account.

3 Claims, 3 Drawing Sheets

US 8,630,618 B2

REAL TIME CHARGING OF SHORT MESSAGES ORIGINATED BY ROAMING PREPAID SUBSCRIBERS

RELATED APPLICATIONS

The present application is a continuation of International Application Number PCT/IL2012/000102, filed Mar. 4, 2012.

FIELD OF THE INVENTION

The present invention is in the field of short message services for cellular phones, more particularly short message services utilizable by prepaid and postpaid cellular telephony subscribers while roaming.

BACKGROUND OF THE INVENTION

One of the disadvantages of prepaid subscriptions offered by many cell phone operators is that outgoing SMS (Short Message Services) are not available to the subscriber when roaming. The reason for the unavailability of these services is that most service operators fail to apply means for carrying out the communication sessions with foreign operators that are required for detecting in real time whether there is sufficient credit in the account of a roaming subscriber for paying for the requested service and for guaranteeing, in real time, the deduction of the respective service fees from such credit.

Obviously, this situation carries a disadvantage for the operator as well. By failing to provide SMS and web browsing services for prepaid subscribers in roaming, a cell phone operator loses significant potential income. A set of standard protocols known as Phase III of Customize Applications for Mobile Enhanced Logic, commonly designated CAMEL3 has been developed to allow for real time charging of Short Messages (SMs) originated by roaming prepaid subscribers based on communication sessions that are carried out for this purpose between the subscriber's home network and the foreign network through which the SM has been originated. Unfortunately, the implementation and use of CAMEL3 involve considerable costs and it is evident that the potential benefits are insufficient to convince hundreds of service operators worldwide to opt for such solution. As a result, operators that do utilize CAMEL3 are unable to make SMS available for prepaid subscribers roaming through any of the large number of foreign networks that have not implemented this system.

Until now, and despite of the resulting loss of profits, many service operators remain without a solution to the above described disadvantage experienced by prepaid subscribers.

WO2007/129315 suggests a CAMEL3-free system that allows prepaid subscribers to extend the range of services available to them while roaming. One disadvantage of the proposed system is its dependency on a client software add-on that must be installed on each prepaid subscription cell phone to be controlled through a dedicated operator's server.

It is therefore within the objects of this invention to provide for cost effective means that will allow a cell phone operator for correlating in real time between the account of a prepaid subscriber and its SMS (and optionally also web browsing) activities while roaming, independently of software installations or modifications to the cellular mobile phone units and without the need to use the CAMEL 3 system.

The following is a description of a typical cellular communication system for which a solution for allowing the use of MO SM (Mobile Originated Short Message) service by prepaid subscribers is required.

An SMSC (short message service center) of a first operator is in communication with a plurality of Mobile Switching Centers (MSCs) of a plurality of other cell phone operators, for receiving SMs addressed to it based on a predetermined SMSC address stored on the SIM (Subscriber Identity Module) card that is installed in each of the cellular mobile phone units subscribed to the first network operator as routing data. Each SM thus received by the SMSC is stored for a predetermined time until successfully delivered to its final destination as determined by the subscriber, in which case the SMSC replies with a delivery confirmation notice. In case the SMSC fails to deliver the SM within a predetermined time limit a failure notice is replied. For the purpose of the present document the network facilities of the operator to whose services the cell phone user is subscribed will be referred to as "Home Network", while all the network facilities of other operators will be referred to as "Foreign Network/s". Subscribers of the Home Network operator will be referred to as visitors or roaming, whenever hosted by any of the foreign networks. A Foreign Network currently hosting a subscriber of the Home Network will be referred to as VPLMN (Visited Public Line Mobile Network).

When a cell phone subscriber is hosted by its operator's Home Network (commonly titled Home Public Line Mobile Network (HPLMN)), the short messages (SMs) originated by the subscriber are received at a Mobile Switching Center (MSC) of the home network, which forwards messages to the SMSC. The system recognizes the user data associated with the respective cell phone in its internal Information Registry (IR) (and alternatively in a database that is accessible to foreign operators—herein below Home Location Register (HLR)), and it can decide accordingly whether to forward the message to the SMSC. In case that the user is a prepaid subscriber, the system will temporarily charge/reserve the appropriate service fees from a PrePaid System (PPS) by which the accounts of prepaid subscribers are controlled, until a final delivery status has been replied from the SMSC and consequently the temporarily charged service fees can be permanently charged (upon confirmation of delivery) or re credited to the subscriber's account (upon failure of delivery notice). However, when a cell phone subscribed with the home network operator is hosted by a foreign network\ (VPLMN), SM originated by said cell phone are received at a Mobile Switching Center associated with the Visitor Location Register (MSC/VLR) of the foreign network, which has no access to the IR of the home operator. In order to guarantee the share of the foreign operator in the service fees, the MSC/VLR of the foreign network is in communication with the Home Location Register (HLR) of the home network, from which it can retrieve the entitlement of the roaming cell phone to use SMS while roaming. For post paid subscribers an SMS flag in the HLR will normally be enabled, and the foreign operator will be able to charge for the service at a later time in a traditional off-line mechanism for post-payment according to its roaming agreement with the home operator, whereas for prepaid subscribers the SMS flag will normally be disabled. Accordingly, MO SM (Mobile Originated Short Message) of postpaid roaming subscribers will be forwarded by the MSC/VLR of the foreign network to an Inter Working Mobile Switching Center (IW-MSC) operated by the foreign network which forwards SMs through an IW-MSC operated by the home network to the destination SMSC of the home network, while MO-SM of prepaid roaming subscribers will be bounced.

It is therefore an object of the present invention to provide for a solution that allows for real time charging for MO SM of roaming prepaid subscribers to be implemented by a cell phone operator at reasonable cost, that does not require specific adaptations in the systems of foreign network operators or a costly procedure of installing software add-ons on prepaid subscribers' mobile units.

SUMMARY OF THE INVENTION

In a first broad aspect the invention relates to a mobile telecommunication system (MTS) capable of allowing for real time charging for MO SMs of prepaid subscribers. The MTS comprises an Inter Working Mobile Switching Center (IW-MSC) (hereinafter referred to also as Inter Working Gateway (IWG)) in communication with conventional proprietor HPLMN facilities of a cell phone operator including at least, a Short Message Service Center (SMSC), a Home Location Register (HLR) and a Prepaid System (PPS) wherein said HPLMN is characterized by further comprising a Real Time Charging Gateway (hereinafter RTCG) unit capable of allowing prepaid subscribers of the operator to enjoy Mobile Originated Short Message Services (MO SMS) while roaming, without requiring special software installation on a subscriber's mobile device for allowing said MO SMS while roaming and without requiring foreign operators to modify their systems for allowing said MO SMS by roaming subscribers of the HPLMN. According to the invention said RTCG is in data communication (possibly through conventional intermediating units existing in the system) with the (i) IW-MSC for receiving redirected Mobile Originated Short Messages (MO SM), (ii) SMSC for forwarding MO SM and for receiving status of delivery messages respectively, (iii) an Information Register (IR) for retrieving subscription type of the device from which a specific MO SM has been sent and for adapting a flow procedure per each specific rerouted MO SM according to the subscription type of its originator, (iv) a Prepaid System (PPS) for reserving an appropriate amount from a prepaid subscribers' credit as a condition for forwarding its MO SM to the SMSC, for bouncing MO SM in the absence of sufficient credit, for permanently deducting an appropriate amount from the subscriber's credit upon receiving a delivery confirmation from the SMSC and for crediting back excessively reserved amounts. In the context of the present invention the term Information Register (IR) relates to any database or registry communicated by the operator for identifying whether a MO SM is of a prepaid subscriber or of a post paid subscriber. Such database or registry may or may not be part of the HLR or of the PPS.

The RTCG unit can be installed for implementation in any conventional telecommunication system. The implementation of the RTCG unit according to the invention requires a one time preparation step by which an existing SMS entitlement flag in the HLR is set 'enabled' for any of the prepaid and postpaid operator's subscribers which are entitled to the service. The implementation of the RTCG unit also requires a one time preparation step of configuring the IW-MSC of the home network to redirect any MO SM to the RTCG. This can be accomplished e.g. by substituting in the GT of the MO-SM the called party address associated with the SMSC by a called party address associated with the RTCG, or by altering the Translation Type (TT) of the GT with a TT which will be recognized by the HPLMN for routing the MO SM to the RTCG. Additional one time preparation steps may comprise adaptations such as allocating to the RTCG one or more Sub System Numbers (SSN), thus allowing internal communications between other sub systems of HPLMN and the RTCG in its different roles and functions, such as an MSC (Mobile Switching Center), e.g. RTCG=MSC(SSN=8) or such as an SSF (Service Switching Functions) of the Intelligent Network (IN) used by the HPLMN, e.g. RTCG=SSF(SSN=251), or such as making the SMSC allowed to Translation Type 3 (TT=3) e.g. in order to allow the RTCG to mark MO SM by their Translation Type before forwarding them to the SMSC, thereby allowing the RTCG to control the call flow involved with MO_SM and to provide for a return path of Ack/NAck notifications from the SMSC based on the Translation Type associated with respective messages and without altering their D-GT (Destination Global Title) and O-GT (Originator Global Title), and also allowing. Additionally or alternatively, the Translation Type may be manipulated by the RTCG for marking MO SM of postpaid subscribers in the CDR lists of the SMSC for billing purpose.

Accordingly, when a foreign network (referred to in this specification also as VPLMN) receives a MO SM from a visitor's cellular mobile device subscribed with a home network implementing the invention, and conventionally communicates with the HLR of the home network for retrieving the eligibility of the roaming device for the service, it will normally find the SMS flag enabled, since in a home network system using the invention the flag for SMS eligibility will normally be enabled for all subscribers. The foreign network will consequently forward the MO SM through its IW-MSC to the IW-MSC of the home network. Upon receiving a MO SM originated by a mobile device of any subscription type for which the invention is to be utilized, the IW-MSC of the home network will forward it, normally through a Signal Transferring Point (STP), to the RTCG. The RTCG will then communicate with the HLR or with the IR for retrieving the subscription type associated with the mobile device from which the MO SM has been originated. In the event the subscriber is of the postpaid type, the RTCG will forward the MO SM to the SMSC, which will forward it to its destination and return a notice of delivery to the VPLMN in a conventional procedure. In case the subscriber is of the prepaid type, the RTCG will communicate with the PPS for reserving the fees required for the service. In case there is insufficient credit, the PPS will reply to the RTCG with a message notifying a failure to reserve the requested fees. As a result, the RTCG will return to the VPLMN a failure of delivery message equivalent to a failure of delivery notice originated by the SMSC.

In case there is sufficient credit in the subscriber's account the PPS will reply to the RTCG with a reservation acknowledgement message. Upon receipt of the reservation acknowledgement message the RTCG will alter the Global Title (GT) of the MO SM (and alternatively will alter the Translation Type of the GT) before forwarding it to the SMSC, to a GT (and in optional embodiments to a Translation Type of the GT) identified with the RTCG as a calling party (or as a switching unit through which internal communications associated with the MO SM are to be routed), such that the SMSC will communicate the delivery status of the MO SM back to the RTCG unit, rather than to the VPLMN as would have been the route of communication without the said alteration of the GT (or of the Translation Type, in said optional embodiments).

Upon receiving a delivery confirmation reply from the SMSC, the RTCG will communicate with the PPS instructing it to permanently deduct the reserved fees from the respective prepaid account, and will forward a delivery confirmation to the MSC/VLR which hosts the roaming device in the VPLMN, mimicking a confirmation delivery notice of the SMSC. In case a failure of delivery has been replied from the SMSC to the RTCG, the RTCG will communicate with the PPS to cancel the reservation of fee and/or to credit the reserved fee back to the respective prepaid account, and will forward the failure of delivery notice to the MSC/VLR.

In preferred embodiments of the invention the RTCG is configured to support any communication protocols required for its communication with other units of the MTS, e.g. in various preferred embodiments of the invention the RTCG supports MAP and CS1+ protocols (e.g. by a Service Switching Function (SSF) constituting a part of the RCTG) toward respective network elements which use these communication protocols (e.g. MAP for communicating with the STP and CS1+ for communicating with the PPS).

It should be appreciated that as a matter of design and in order to provide for load sharing and/or to improve sustainability and availability of the services offered by the RTCG, a plurality of RTCG units and any other related network components (e.g. STPs) may be used in an HPLMN without departing from the scope of the present invention.

In another broad aspect the invention relates to a method for delivering short messages originated by roaming prepaid subscribers, the method is characterized by (i) enabling in an HLR of a home network a plurality of entitlement flags respectively associated with the entitlement of a plurality of prepaid subscribers for short message services when roaming; (ii) forwarding at least short messages originated by roaming prepaid subscribers to a real time charging gateway (RTCG) installed in facilities of the home network; (iii) charging in real time respective prepaid accounts for successful delivery of said short messages from the RTCG to an SMSC and from the SMSC to a destination whenever the balance of respective prepaid accounts allows and bouncing short messages from the RTCG in case the balance does not allow for their delivery; (iv) paying for the services provided by a VPLMN for forwarding to the home network short messages originated by roaming prepaid subscribers, through a postpaid accounting procedure carried out between an owner of the HPLMN and an owner of the VPLMN, regardless of the fact that some of the services has actually been provided to prepaid subscribers.

In various preferred embodiments of the method, the RTCG is configured to retrieve from an IR, e.g. an HLR, a subscription type associated with an end user device from which the SM has been originated, and to (a) respond as a relay between the SMSC and the MSC/VLR in case said MO SM is from a postpaid subscriber; (b) respond by communication with the PPS according to said step (iii) in case said MO SM is from a prepaid subscriber.

Summarizing the above furthermore, the invention relates to an HPLMN characterized by a real time charging gateway (RTCG) configured to receive short messages originated by cellular communication devices of prepaid subscriptions while hosted by VPLMN, to communicate with PPS for real time deduction or reservation of applicable service fees from prepaid accounts associated with the prepaid subscriptions respectively, to forward said messages to a conventional SMSC of said HPLMN upon real time deduction or reservation of applicable service fees from prepaid accounts associated with the prepaid subscriptions respectively or return a NAck notice and refrain from forwarding any of said messages in case there are insufficient fees in respective prepaid accounts, thereby allowing for an offline (postpaid like) accounting procedure between an owner of the HPLMN and owners of a plurality of VPLMN, for the delivery of prepaid short messages.

Short messages are normally bearing a global title comprising an originator address identifying their originating cellular communication device. The RTCG is programmed to substitute the originator address appearing in the global title or a Translation Type thereof by a pseudo originator address or by a special Translation Type value identifying the RTCG as the originator of the short message, and to forward the short message to the SMSC with said pseudo global title or said special Translation Type such that the short message delivery confirmation or denial will be returned from the SMSC to the RTCG.

In various preferred embodiments of the invention, the RTCG is further programmed to receive status of delivery notifications from the SMSC and to substitute the destination address (namely called number party (CLD)) appearing in the global title of the status of delivery notifications with the address of the cellular communication device by which a respective short message has been originated, such that the short delivery confirmation or denial message will be redirected from the RTCG to the originating cellular communication device.

The RTCG is adapted to communicate with a conventional prepaid system (PPS) for verifying whether a balance of a prepaid account allows for providing a requested service to a cellular communication device associated with that account and/or for instructing transactions relating to applicable service fees, between prepaid accounts associated with cellular communication devices by which given services have been requested/respective short messages have been originated and between an account of the HPLMN's owner.

In preferred embodiments of the invention the RTCG is configured to generate a negative acknowledgement of delivery notification (NAck) such as the NAck originated by the SMSC when an attempt to deliver a message to its destination has failed, and to forward said NAck to a respective cellular communication device hosted by a VPLMN whenever a balance of a prepaid account associated with the respective cellular communication device has been verified by communication with the PPS as insufficient to allow forwarding to the SMSC a short message which has been originated by the respective cellular communication device while it was hosted by a VPLMN.

Preferably said NAck generating capability of the RTCG comprises placing the address of an SMSC as the originator address in the global title of the generated NAck. The RTCG is adapted to postpone delivery of a short message received by, until receiving a notification from the PPS confirming that an applicable amount of fee to be charged for the delivery has been reserved or deducted from a respective prepaid account.

The RTCG is adapted to retrieve subscription types associated with cellular communication devices from which short messages that have been received by the RTCG for delivery are originated while said cellular communication devices are hosted by a VPLMN. Accordingly, the RTCG of these embodiments may be programmed to act as a relay between the SMSC and the VPLMN for communications associated with short messages originated by cellular communication devices for which a retrieved subscription type is postpaid. In embodiments in which the RTCG is programmed to replace the translation type of the GT of postpaid related short messages before forwarding them to the SMSC, it will normally be programmed, however, to reset the TT to the original value when forwarding Ack/Nack notifications from the SMSC to the VPLMN.

The RTCG according to the invention may be utilized by an HPLMN operator for real time charging of prepaid subscribers for requested services such as content delivery and/or internet browsing, thereby enabling an HPLMN operator to allow such services to its prepaid subscribers.

A method for delivering short messages originated by roaming prepaid subscribers, the method characterized by (i) enabling in an HLR of a home network a plurality of entitlement flags respectively associated with the entitlement of a plurality of prepaid subscribers for short message services when roaming; (ii) forwarding at least short messages originated by roaming prepaid subscribers to a real time charging gateway (RTCG) installed in facilities of the home network; (iii) charging in real time respective prepaid accounts for successful delivery of said short messages from the RTCG to an SMSC and from the SMSC to a destination whenever the balance of respective prepaid accounts allows and bouncing short messages from the RTCG in case the balance does not allow for their delivery; (iv) paying for the services provided by a VPLMN for forwarding to the home network short messages originated by roaming prepaid subscribers, through a postpaid accounting procedure carried out between an owner of the HPLMN and an owner of the VPLMN, regardless of the fact that some of the services have actually been provided to prepaid subscribers.

According to the embodiment of RTCG in use, the RTCG may be configured to substitute the originator address (Calling number party (CLG)) appearing in the global title (GT) of the short message by a pseudo originator address identifying the RTCG as the originator of the short message, and/or to change the Translation Type (TT) of the GT, before forwarding the short message to the SMSC. When the RTCG receives status of delivery notifications from the SMSC it substitutes the RTCG's destination address (Called number party (CLD)) appearing in the global title of the status of delivery notifications by the address of the cellular communication device by which a respective short message has been originated and/or resets the Translation Type (TT) in the GT The method preferably further comprises a step of the RTCG generating a NAck notification of the type commonly originated by SMSC upon failing to deliver a short message, and routing the generated notification from the RTCG toward a roaming cellular device of a prepaid subscriber, whenever the balance in a prepaid account does not allow for delivering the short message.

The method further comprises a step of retrieving the subscription type of a short message originator once the short message has arrived at the RTCG and deciding accordingly whether or not to subject the delivery of the message to the SMSC to the real time charging step.

DETAILED DESCRIPTION OF THE INVENTION

The invention will be further described by the following Figures. These are solely intended to illustrate some exemplary embodiments of the invention and in no manner intend to limit its scope.

DETAILED DESCRIPTION OF THE FIGURES

Figure 1:
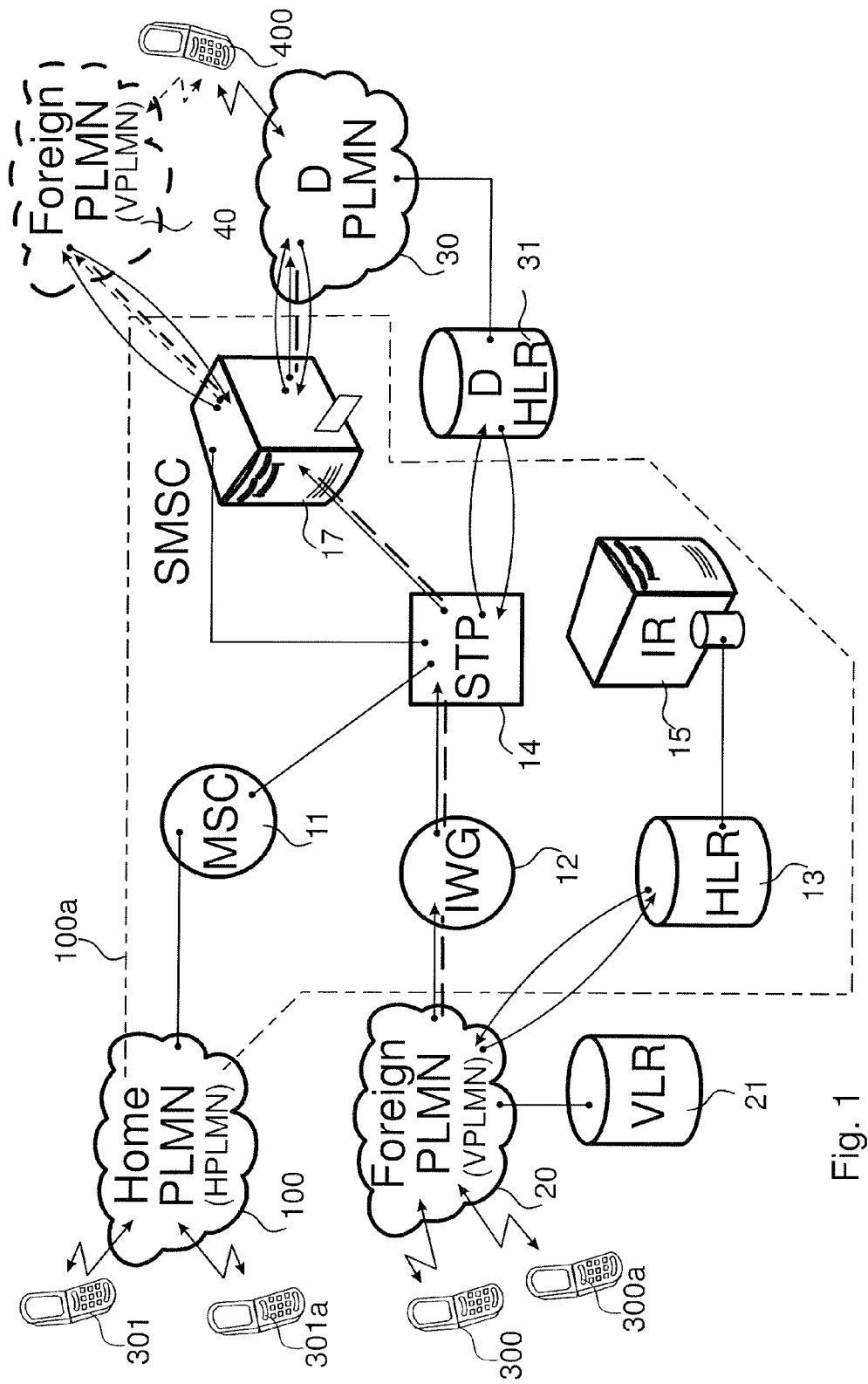
FIG. 1 illustrates a global cellular communication network having conventional HPLMN lacking the invented RTCG.

FIG. 1 illustrates a block diagram of a typical global cellular telecommunication network which does not make use of the present invention. This prior art network which may or may not comprise a CAMEL3 platform, comprises a home network (HPLMN) (100) and a plurality of foreign networks, e.g. VPLMN (20) and VPLMN (40). At least some of the VPLMNs and VPLMN (20) among them, do not posses a CAMEL3 platform. The global network comprises also a Destination network D-PLMN (30), which hosts a cellular device (400) constituting a recipient for MO SM sent by devices subscribed with the home network. The cellular device (400) may be a subscriber of the home network or of any of the foreign networks. Accordingly, the D-PLMN (30) may happen to be either the HPLMN (100), the specific VPLMN (20), or any other (not illustrated) VPLMN.

MO SMs sent by either a roaming device (300) or non roaming devices (301)(301*a*) are forwarded to the Signaling Transfer Point (STP) (14) of the home network, which in turn transmits them to the SMSC (17) from which they are delivered to the destination (400) through the D-PLMN (30) hosting it, or alternatively through a VPLMN (40) hosting it. The route of the MO SM from the roaming device to its final destination (400) is shown by left to right pointing arrows associated with a parallel dashed line resembling a return path of delivery tracking data. Pairs of curved arrows represent communications between units of the network, which are not necessarily flowing directly between the units connected by these curved arrows, rather through switches or relays such as Signal Transfer Points, Inter Working Gateways (IWG) and the like. The routing data relating to the targeted device (400) is retrieved by the STP (14) by communication with the Home Location Register of the destination network (D HLR) (31) in which the location data of all the subscribers of the destination network is registered. Normally, since the HPLMN (100) does not make use of the invention, the STP (14) will receive MO SM of roaming devices (300)(300*a*), only in case they are of postpaid subscribers. This is because the VPLMN communicates with the HLR (13) of the home network for verifying the entitlement of a roaming device (300)(300*a*) to Short Message Services (SMS), while conventionally, an entitlement flag associated with SMS will be enabled in the HLR (13) only for postpaid subscribers (300), and will be disabled for all prepaid subscribers (300*a*). It is accordingly appreciable that prepaid subscribers will be able to send MO SMs only while non-roaming, i.e. through a cellular device such as (301*a*) hosted by the home network (100). MO SM sent by a roaming device (300*a*) will be bounced by the VPLMN (20) if the device is of a prepaid subscription, as a result of a respective 'disabled' flag in the HLR (13), associated with SMS for a specific device (300*a*) being a prepaid subscriber.

Figure 2:
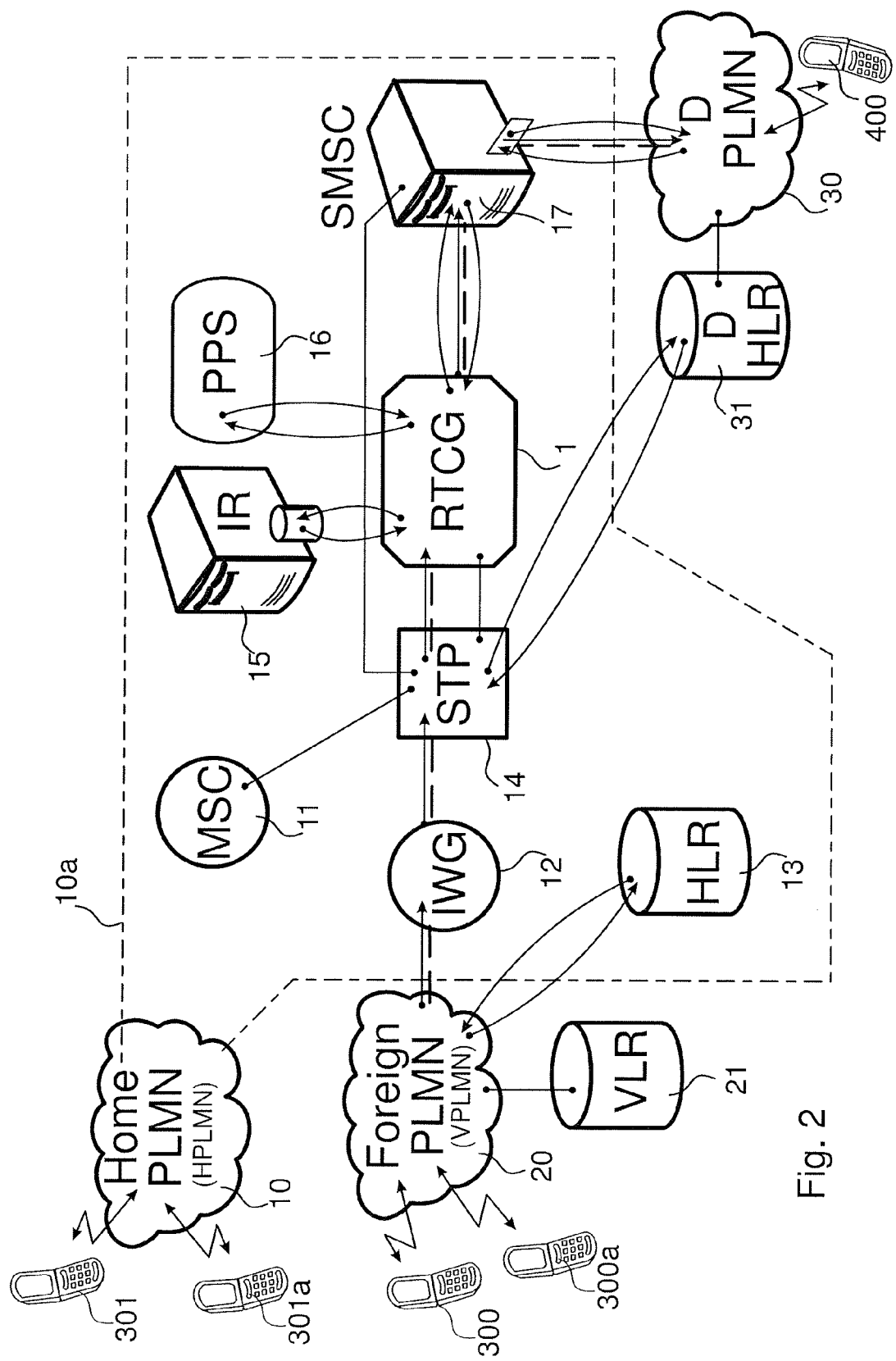
FIG. 2 illustrates a global cellular communication network which includes an HPLMN utilizing the present invention.

FIG. 2 illustrates a block diagram of a cellular telephony network (10), referred to in the present specification as "home network" or as HPLMN, improved by inclusion of the invented Real Time Charging Gateway (RTCG) (1). Network components to be discussed hereinafter that are very commonly under direct control of the operator of the home network (10) are presented in FIG. 2 within the area encompassed by the dashed line (10*a*). Since the invention is implemented by the HPLMN (10), cellular devices (300) (300*a*)(301)(301*a*) subscribed with the home network can send MO SMs either while hosted by the HPLMN (10*a*) or as visitors of a VPLMN (20), even if they are prepaid. When a VPLMN receives an SM sent by a subscriber of another network, it will forward the SM to the appropriate SMSC only after verifying the entitlement of the sender to the service. The entitlement is examined through communication between the VPLMN and a Home Location Register (HLR) of the home network of the roaming device. In case the subscriber is prepaid in a conventional network not utilizing the present invention, its entitlement to SMS will be denied by the HLR and the VPLMN will terminate the session without forwarding the SM. The solution suggested by the present invention is utilizable by the home network operator without requiring that the operators of foreign networks make any adaptations. The objective of the present invention is achieved by installing the inventive RTCG in the home network thereby allowing all the MO SM of roaming prepaid subscribers of the home network to be treated by the foreign network as if they were originated by postpaid subscribers, while simultaneously allowing the home network to charge the accounts of its roaming prepaid subscribers in real time for their successfully delivered MO SMs, notwithstanding the fact the foreign network treated them as postpaid.

In more detail, this is how the invention works: cellular devices (300)(300a) which may be either postpaid or prepaid subscribers of the home network (10) are currently hosted by a specific one (20) of a plurality of (not illustrated) foreign Public Line Mobile Networks (VPLMNs) operated by a plurality of foreign operators and constituting a global network in which the HPLMN (10) is included. While hosted by a VPLMN the cellular devices (300)(300a), each of which will be referred to also as a "roaming device", are registered in a Visitor Location Register (VLR)(21) of the respective VPLMN (20). When a MO SM is sent by a roaming device (300) it is received in an MSC of the VPLMN (20). The route of the MO SM from the roaming device to its final destination (400) is shown by left to right pointing arrows associated with a parallel dashed line resembling a return path of delivery tracking data. As mentioned above, the roaming device may be a prepaid subscriber, which in the following description will be represented by the cellular device (300a), and normally, in case the VPLMN has no CAMEL3 communication with the HPLMN, it shall not be compensated for delivering MO SM associated with prepaid subscribers of the home network. As a regular routine the VPLMN (20) therefore communicates with a Home Location Register (HLR)(13) of the home network for verifying whether the roaming device (300a) is entitled to use Short Message Service (SMS), i.e. whether the foreign operator will be paid by the home operator for successful deliveries of SMs originated by the specific device (300a). Since the home network (10) utilizes the invented RTCG (1) which allows it to charge in real time for MO SM of roaming prepaid subscribers, it can set its HLR (13) such that the entitlement of all its subscribers, including the prepaid ones, will be presented as enabled for SMS. Once the HLR (13) has been set accordingly in a preceding one time preparation step, all the home network subscribers of the home network will be presented to foreign networks as entitled to SMS, such that the foreign operator will treat those SMS as it treats postpaid subscribers and will charge for the rendered services at a later time in a traditional off-line procedure for post-payment according to its roaming agreement with the home operator, regardless of the fact that some of the services were actually provided to prepaid subscribers.

Accordingly, the VPLMN (20) will forward any MO SM of a home network subscriber to the IWG (12) of the home network. The Inter Working Gateway (IWG) (12) is not necessarily owned by the operator of the home network, yet considered under its direct control (thus illustrated within the HPLMN (10)) since the operator normally may instruct the IWG owner to configure the IWG according to operator's specific requirements. Normally, i.e. without the invention, since MO SMs received by the IWG (12) are always associated with postpaid subscribers, the IWG is acting as a relay, delivering any MO SM received by to an STP of the home network, from which it is transmitted to the SMSC (17) of the home network said SMSC in turn relaying it to its destination, without applying procedures for collecting the respective service fees in advance. In order to allow the home network for real time charging of MO SM of prepaid subscribers, the IWG (12) is prepared in advance in a one time preceding step, to redirect at least MO SM of prepaid subscribers to the invented RTCG (1). This is accomplished by configuring the IWG (12) (by said preceding step) to redirect MO SM originated by prepaid subscribers to the RTCG (1) by altering the Global Title (GT) normally appearing in the routing part of MO SM to a GT allocated by the operator to the RTCG (1), or by altering the Translation Type (TT) of the GT to a TT that will be recognized by the HPLMN for forwarding the MO SM to the RTCG. Accordingly, when the STP (14) receives a MO SM having an altered GT from the IWG (12) it will identify it as designating the RTCG (1) and will forward it to the RTCG (1) by assigning it with the SSN allocated to the RTCG (for example, SSN=8) in substitution of the conventional SSN=7 associated with SMSC. The IWG (12) will still forward, however, directly to the SMSC (17), for conventional treatment non roaming MO SMs, i.e. those sent by non roaming devices (301)(301a) hosted by the HPLMN and received from any of a plurality of Mobile Switching Centers (only one of which is illustrated in this figure) MSC (11) of the HPLMN (10).

Once a MO SM is received by the RTCG (1), the type of subscription of the roaming device ((300) postpaid, or (300a) prepaid), is retrievable by the RTCG through communication with either a PrePaid System (PPS) (16), or an HLR (13) or an Internal Register (IR) (15), or any other database accessible by or being part of the home network, from which the subscription type can be retrieved. The communication of the RTCG (1) with other subsystems of the Intelligent Network is represented by a pair of curved arrows between the RTCG (1) and each respective subsystem. In the preferred embodiment the communication between the RTCG and the subsystems is flowing through the STP (14) which is in direct communication with each subsystem, thus being capable of exchanging messages between the subsystems according to a respective subsystem number allocated for each subsystem and programmed in the STP (a typical example of SSNs programmed in a typical STP is as follows: SSN=7 is the SMSC, SSN=8 is the RTCG, SSN=252 is the PPS and SSN 251 is an SSF part of the RTCG in communication with the PPS). It is appreciated, however, that as a matter of design the RTCG may be connected directly to subsystems of interest, e.g. it may be connected directly to the IR for subscription type retrieval.

In the simple case that the subscription type retrieved for a currently treated MO SM is postpaid (300), no real time charging is required and the RTCG will alter its GT back to the original form designating it to the SMSC (17) i.e. as appeared before the redirection step performed by the IWG (12). The RTCG (1) will then return the MO SM to the STP(14) for forwarding it to the SMSC (17). The STP will consequently forward the MO SM to the SMSC (17) for conventional treatment.

In the more complicated case that the MO SM is of a prepaid subscriber (300a), the RTCG (1) communicates with the PPS (16), for verifying whether the specific subscriber has sufficient funds to allow for the service, and for reserving or temporarily subtracting the prescribed fees from the respective prepaid account. In case there are insufficient funds, the RTCG (1) will generate a Negative Acknowledgement notice and will forward it through the STP (14) and the IGW (12) to the VPLMN, and the MO SM will become terminated without delivery. In case the fee for the delivery has been reserved by the PPS (16), the RTCG (1) will alter the calling party address in the Global Title (GT) of the MO SM from that of the mobile device (300a) as a calling party to that of the RTCG, and will forward it to the SMSC (17) to be delivered to its destination (400). Since the SMSC has received the MO SM bearing the calling party address of the RTCG (1) in its GT, it will return any acknowledgment of delivery notification to the RTCG (1). In case the message has successfully been relayed to its destination, the RTCG (1) will receive an Acknowledgement of delivery notification (Ack) from the SMSC (17), in which case it will alter the GT back to reflect the sending device as the calling party, and will transmit the Ack to the VPLMN through the STP (14) and the IWG (12). Furthermore the RTCG (1) will communicate with the PPS (16) notifying it to permanently subtract the reserved fee from the respective prepaid account. The alteration of the calling party address in the GT from "real" (that of the mobile device) to "pseudo" (that of the RTCG), can be handled through a Pseudo/Real Cash Table in the RTCG.

In various embodiments of the invention the RTCG may be configured to assume that the calling device (300)(300a) is postpaid in case the IR is down for any reason and retrieval of the subscription type has therefore been failed, thereby ensuring continuity of services for postpaid subscribers irrespective of the efforts for debiting prepaid subscribers in real time. The assumption that a calling party is a postpaid subscriber in case that retrieval of this information has been failed, may be either automatic or subjected to predetermined conditions and verifications with which the RTCG may be programmed.

In case the SMSC (17) has failed to deliver the message to its destination (400), it will return a negative Acknowledgement notice (NAck) to the RTCG (1), in which case the RTCG (1) will alter the GT back to reflect the sending device as a calling party, and will transmit the NAck to the VPLMN through the STP (14) and the IWG (12). Furthermore the RTCG (I) will communicate with the PPS (16) notifying it to free the reserved fee and to credit the fees back to the respective prepaid account.

Figures 3, 4, 5:
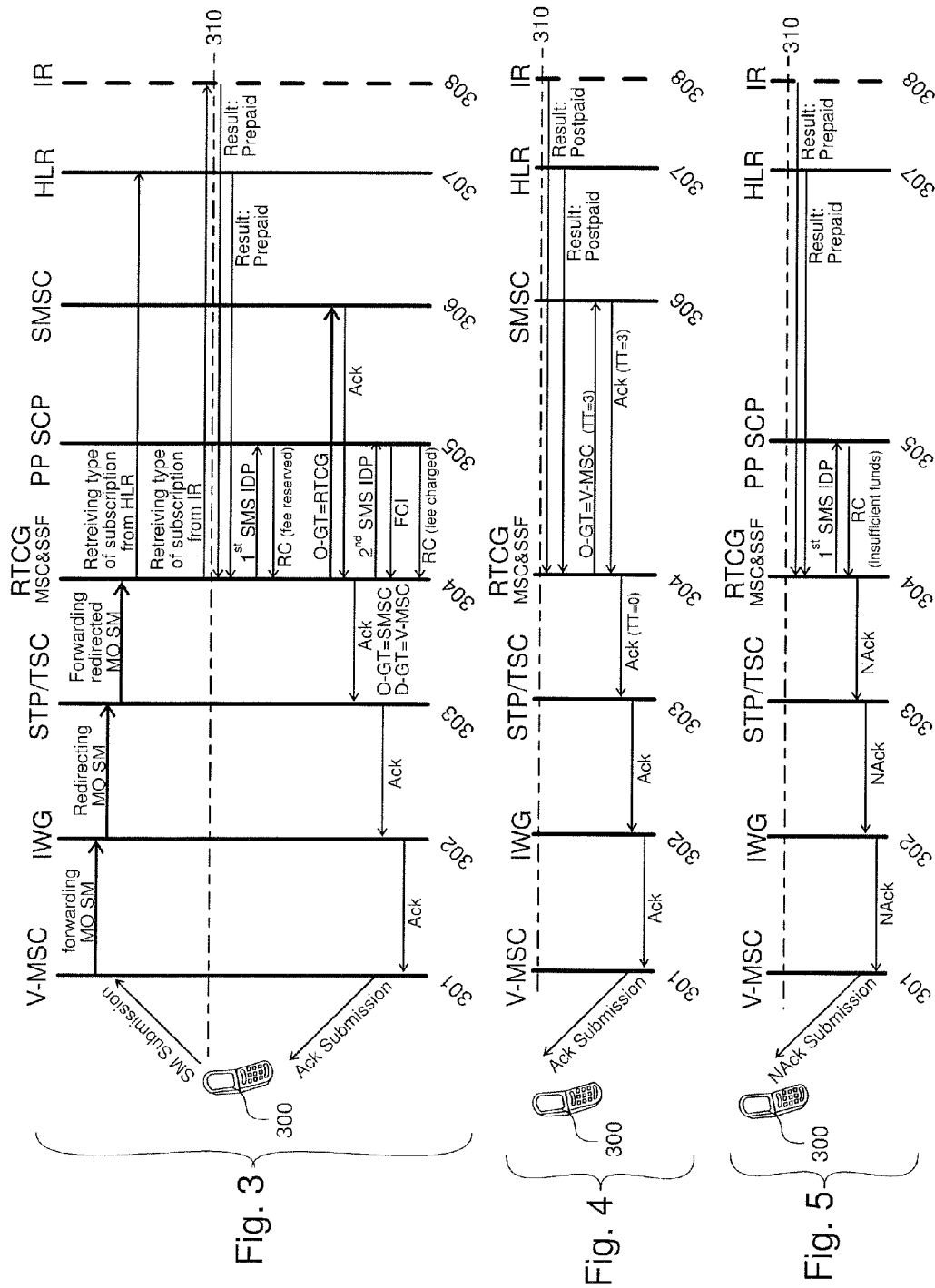
FIG. 3 illustrates a flow diagram of a MO SM sent from a cellular device subscribed at a home network, while roaming at a foreign network, according to a first typical scenario.
FIG. 4 illustrates a flow diagram of a MO SM sent from a cellular device subscribed at a home network, while roaming at a foreign network, according to a second typical scenario.
FIG. 5 illustrates a flow diagram of a MO SM sent from a cellular device subscribed at a home network, while roaming at a foreign network, according to a third typical scenario.

FIG. 3. illustrates a flow diagram of a MO SM sent from a cellular device (300) subscribed at a home network, while roaming at a foreign network. The cellular device (300) is thus registered in a Visitor Location Register (VLR) associated with a Mobile Switching Center (MSC) of the foreign network in which the roaming device is hosted. Said MSC will be referred to hereinafter V-MSC (Visitors' Mobile Switching Center) (301). Upon receiving a MO SM from a roaming device, the foreign network conventionally communicates with a Home Location Register (HLR) of the home network, for verifying the entitlement of the roaming device to the requested service. This verification step is not shown here, since according to the present invention an entitlement flag relating to SMS is normally enabled in the HLR of the home network, thus entitlement will normally be confirmed in said verification step for all the subscribers of a home network making use of the present invention. Upon confirmation of entitlement, the V-MSC (301) will forward the MO SM to the Inter Working Gateway (IWG) (302) of the home network, as presented by the arrow marked "forwarding MO SM". Both types of MO SM are by a SIM preprogrammed definition intended to be forwarded to the SMSC (306) of the home network, however the IWG (302) of the home network is configured, according to the invention, to translate the SMSC address in the GT of each MO SM into a new called party address adapted to forward the SM to a Real Time Charging Gateway (RTCG) (304) constituting the main part of the invention. The MO SM will thus be transmitted from the IWG (302) to the STP/TSC (Signaling Transfer Point) (303) with the RTCG address as the called party address in the GT, as represented by the arrow marked "Redirecting MO SM". The STP/TSC will accordingly submit the MO SM to the RTCG, as represented by the arrow marked "Forwarding redirected MO SM". Once the MO SM is received at the RTCG (304), the RTCG communicates with the Home Location Register HLR (307) of the home network for retrieving the subscription type of the mobile device from which the MO SM is originated (300) as represented by the arrow marked "retrieving type of subscription from HLR".

Alternatively the RTCG communicates with the Internal Register (IR) (308) of the home network for retrieving the subscription type of the cellular device (300), as represented by the arrow marked "Retrieving type of subscription from IR". While both alternatives are exemplified in this call flow, it is noted that only one of those will actually appear in a typical call flow of the exemplified embodiment. It will also be appreciated that databases other than the HLR and the IR (e.g. the PPS) may be used for retrieval of the subscription type, as a matter of design. In embodiments of the invention where the IWG (12) is configured to redirect to the RTCG only MO SM originated by prepaid subscribers, the step of retrieving the subscription type may be skipped.

From this point on, the flow of the process depends on the subscription type, and may be developed in anyone of three possible scenarios illustrated below the dashed line (310), one of which is illustrated in the present Figure and the remaining two in FIGS. 4 and 5, respectively. According to a first scenario shown in the present Figure, the reply from either the HLR (307) or, according to the above alternative, the IR (308) is that the cellular device (300) is registered as a prepaid subscriber, as represented by the respective arrow marked "Result: Prepaid". In this situation, the fate of the MO SM depends on whether there are sufficient funds in the prepaid account associated with the device, that can be reserved, or temporarily deducted, in order to guarantee payment for the service upon successful delivery of the MO SM to its intended recipient. The RTCG thus communicates with the PrePaid System (PPS) (305) of the home network as represented by the arrow marked "$1^{st}$ SMS IDP" (in which IDP is acronym for "Initial Detection Point"), in an attempt to reserve the fees to be charged, as a condition for continuing the transmission. A second scenario, illustrated in the present Figure is that the PPS (305) responds to the RTCG (304) with affirmation, as represented by the arrow marked "RC (fee reserved)" in which RC stands for "Release Call".

However, since the fees reserved for the delivery of the MO SM are to be permanently deducted from the prepaid account only in case the delivery has been successfully relayed to the targeted device, the Global Title (GT) of the sender (300) is replaced by a GT of the RTCG, such that the SMSC will communicate the status of delivery to the RTCG rather than directly toward the cellular device (300). Accordingly, the RTCG forwards the MO SM to the SMSC with a modified (pseudo) GT. In case the MO SM has been successfully relayed to its destination the SMSC will reply to the RTCG with an acknowledgement of delivery message. Consequently, the RTCG will initiate a second communication with the PPS, by which the PPS will be instructed to permanently deduce the reserved fees from the prepaid account. Furthermore, the RTCG will revert the GT in the acknowledgement of delivery message replied from the SMSC (which now reflects the RTCG as the originator of the SM) back to the original (real) GT that reflects the identity of the sending device (300), and will forward the thus reverted acknowledgment of delivery message to the foreign network, which can then forward it in accordance with its preprogrammed procedure to the roaming device (300) through the appropriate V-MSC (301). The operator of the foreign network will then be able to collect from the home network operator its share in the service fees, through a conventional off-line procedure, as if the SM sender were a postpaid subscriber. In case the delivery has failed due to technical reasons (e.g. the targeted device was unreachable for more than a predetermined storage period to which the SMSC is committed for undeliverable SMs), the SMSC will reply to the RTCG with a Negative Acknowledgement (NAck). The RTCG will instruct the PPS to refund the reserved fees to the prepaid account, will revert the GT in the NAck message to the GT of the sending device (300), and will forward the NAck with the reverted (real) GT to the foreign network. The foreign network can then deal with the NAck according to its traditional practice in such events.

FIG. 4 illustrates the course of the call flow in the second scenario mentioned above. In this scenario the "Retrieving type of subscription" communication between the RTCG (304) and the HLR (307) and alternatively the IR (308) (only one of which will normally become realized in a typical call flow, depending on the actual database from which the RTCG is programmed to retrieve the subscription type), reveals that the cellular device (300) is associated with a postpaid subscription, as represented by the respective arrows marked "Result: Postpaid"

For postpaid subscribers the RTCG operates as a relay. It forwards the MO SM to the SMSC bearing its original GT as represented by the arrow marked "O-GT=V-MSC, which means that the originator address in the GT is that of the V-MCS through which the MO SM has been forwarded. In various alternative embodiments of the invention the Translation Type value associated with the GT (normally TT=0) may be replaced by the RTCG to specify some vacant value (e.g. TT=3) thereby tagging within the CDR lists generated by the SMSC those MO SM of postpaid subscribers which have been forwarded to the SMSC by the RTCG, thus allowing the operator to charge postpaid subscribers based on CDRs generated by the SMSC, as an alternative of charging them based on CDRs originated by respective foreign operators. Once either an acknowledgement of delivery message (Ack) or a negative acknowledgement of delivery message (NAck) is replied from the SMSC as represented by the arrow marked "Ack/NAck", the RTCG forwards it to the STP/TSC after reverting the Translation Type to its original value (normally TT=0) in said embodiments in which the Translation Type has been changed as mentioned above. The Ack/Nack message is then delivered from the STP/TSC (in embodiments in which the translation type is not replaced by the RTCG, the SMSC will respond with Ack/Nack notifications directly to the STP/TSC) to the IWG which in turn transmits it to the foreign network for conventional treatment.

FIG. 5 illustrates the course of the call flow in the third scenario mentioned above. In this scenario the "Retrieving type of subscription" communication between the RTCG (304) and the HLR (307) and alternatively the IR (308) (only one of which will normally become realized in a system, depending on the actual database from which the RTCG is programmed to retrieve the subscription type), reveals that the cellular device (300) is associated with a prepaid subscription, as represented by the arrows marked "Result: "PrePaid". This scenario differs however from the above described first scenario, in that the PPS replies to the RTCG that the funds in the prepaid account are not sufficient to allow delivery of the MO SM, as represented by the arrow "RC (insufficient funds)". As a result, the RTCG initiates a Negative Acknowledgement message (NAck) equivalent to a NAck originated by the SMSC and sends it to the STP/TSC which in turn forwards it to the IWG from which it is transmitted to the foreign network for conventional processing. In various preferred embodiments of the invention the RTCG is further configured to initiate an MT SM (Mobile Terminated Short Message) following said NAck, by which the originator of the failed to deliver MO SM will be notified that the failure of delivery of his message is due to insufficient funds in the respective prepaid account.

The invention claimed is:

1. A method for delivering short messages originated by roaming prepaid subscribers, the method characterized by (i) enabling in an HLR of a home network a plurality of entitlement flags respectively associated with the entitlement of a plurality of prepaid subscribers for short message services when roaming; (ii) forwarding at least short messages originated by roaming prepaid subscribers to a real time charging gateway (RTCG) installed in facilities of the home network; (iii) charging in real time respective prepaid accounts for successful delivery of said short messages from the RTCG to an SMSC and from the SMSC to a destination whenever the balance of respective prepaid accounts allows and bouncing short messages from the RTCG in case the balance does not allow for their delivery; (iv) paying for the services provided by a VPLMN for forwarding to the home network short messages originated by roaming prepaid subscribers, through a postpaid accounting procedure carried out between an owner of the HPLMN and an owner of the VPLMN, regardless of the fact that some of the services have actually been provided to prepaid subscribers, wherein the RTCG is configured to substitute the originator address appearing in the global title (GT) of the short message by a pseudo originator address identifying the RTCG as the originator of the short message, and/or to change the Translation Type (TT) of the GT, before forwarding the short message to the SMSC, wherein the RTCG receives status of delivery notifications from the SMSC and substitutes the RTCG's destination address appearing in the global title (GT) of the status of delivery notifications by the address of the cellular communication device by which a respective short message has been originated and/or resets the Translation Type (TT) in the GT.

2. A method for delivering short messages according to claim 1, further comprising a step of the RTCG mimicking a NAck notification of the type commonly originated by SMSC upon failing to deliver a short message, and routing the mimicked notification toward a roaming cellular device of a prepaid subscriber, whenever the balance in a prepaid account does not allow for delivering the short message. A method for delivering short messages according to claim 1, further comprising a step of retrieving the subscription type of a short message originator once the short message has arrived at the RTCG and deciding accordingly whether or not to subject the delivery of the message to the SMSC to the real time charging-step.

3. A method for delivering short messages according to claim 1, further comprising a step of retrieving the subscription type of a short message originator once the short message has arrived at the RTCG and deciding accordingly whether or not to subject the delivery of the message to the SMSC to the real time charging step.

\* \* \* \* \*